United States Patent [19]
Rempel

[11] Patent Number: 5,921,738
[45] Date of Patent: Jul. 13, 1999

[54] SQUARE BALE TRANSPORTER

[75] Inventor: William Rempel, Winnipeg, Canada

[73] Assignee: Inland Industries Inc., Winnipeg, Canada

[21] Appl. No.: 08/911,031

[22] Filed: Aug. 14, 1997

[51] Int. Cl.$^6$ ................................................. A01D 87/12
[52] U.S. Cl. ...................... 414/111; 414/24.5; 414/789.7; 414/486; 414/492; 414/555
[58] Field of Search ................. 414/789.7, 24.5, 414/111, 518, 501, 502, 486, 555, 812, 813, 491, 492

[56] References Cited

U.S. PATENT DOCUMENTS

| | | | |
|---|---|---|---|
| 3,811,584 | 5/1974 | Grey et al. | 414/789.7 |
| 3,952,881 | 4/1976 | Knudson | 414/789.7 |
| 4,259,035 | 3/1981 | DeCoene et al. | 414/789.7 |
| 4,363,583 | 12/1982 | Bontrager | 414/789.7 |
| 4,498,829 | 2/1985 | Spikes | 414/789.7 |
| 4,604,018 | 8/1986 | Kruse | 414/789.7 |
| 4,952,111 | 8/1990 | Callahan | 414/789.7 |
| 4,971,504 | 11/1990 | Klompien | 414/789.7 |
| 5,405,229 | 4/1995 | Tilley | 414/111 |
| 5,647,716 | 7/1997 | Tilley | 414/789.7 |
| 5,690,461 | 11/1997 | Tilley | 414/789.7 |
| 5,730,572 | 3/1998 | Scheuren | 414/24.5 |

FOREIGN PATENT DOCUMENTS 55-114625   9/1980   Japan .................. 414/789.7

*Primary Examiner*—David A. Bucci
*Assistant Examiner*—Douglas Hess
*Attorney, Agent, or Firm*—Murray E. Thrift; Adrian D. Battison

[57] ABSTRACT

A bale transporting and stacking method and apparatus are disclosed. The bales are picked up from the field and placed bottom side down on the bed of the bale transporter. When the transporter is full, the bed, or part of the bed, is tipped upright to form a stack of bales. The process is repeated with the bales being located adjacent one another. With this system, the outer side of each column of bales is the original bottom side of the bale. This side is denser and structurally less prone to collapse than the less dense top side of the bale. Consequently, the stack is more stable than prior art stacks with the reverse arrangement. The apparatus includes a lift arm for lifting the bales, a pivoting bale clamp for rotating the bales over the bale bed and a pusher mechanism for advancing the bales along the bed towards the back end.

12 Claims, 11 Drawing Sheets

SQUARE BALE TRANSPORTER

FIELD OF THE INVENTION

The present invention relates to the transportation and storage of baled agricultural products and more particularly to the pickup, transportation and stacking of rectangular bales.

BACKGROUND

The baling of hay and other crops in large rectangular bales has become increasingly popular. One attraction of these bales is their shape, which lends itself to stacking much more readily than large round bales. Difficulties have however, been encountered with the stability of the bale stacks. It has been found that the stacks tend to sag and collapse to the front side. In Tilley et al. U.S. Pat. No. 5,405,229, issued Apr. 11, 1995, this is attributed to the drying and shrinkage of the bales. The patent proposes a complex bale manipulating process carried out using a rotating and tilting turntable. This allows the bales to be accumulated on a tilting bed so that they can be arranged in a "tied" stack.

The applicant has now discovered that the bale collapse problem can be attributed to a density differential within the bales. As a large rectangular bale is formed in a baling chamber, the settling of the baled material results in a bale that is denser at the bottom than at the top. As the bale rests in the field, the natural compaction of the bottom of the bale may augment this effect.

With a conventional bale transporter, bales are picked up and inverted as they are loaded onto the bed of the transporter. This places the denser bottom of the bale on top. When the transporter bed is tipped up to deposit the bales in a stack, the denser bottom goes to the back of the stack adjacent the previous layer in the stack. The softer, less dense top is now on the exposed front side. The tendency of the bale is then to settle towards the front, causing instability and potential collapse.

The present invention is concerned with bale improvements in the prior art methods and apparatus for handling bales.

SUMMARY OF THE INVENTION

According to one aspect of the invention there is provided a method of stacking rectangular bales each of which has a top and a bottom, said method comprising:

forming a first stack of bales with the top of each bale in the stack arranged on a back side of the first stack and the bottom of each bale in the stack arranged on a front side of the first stack; and forming a second stack of bales with the top of each bale in the stack arranged on a back side of the second stack and the bottom of each bale in the second stack arranged on a front side of the second stack, the back side of the second stack confronting the back side of the first stack.

The stacks are thus reversed from the prior art arrangement, with the bottom sides, which are denser, facing out. When additional stacks are added, they are added with the denser bottoms of the bales on the outer sides. When the bales tend to settle on the less dense sides that are on the inner, back side, the bales will be supported by the next layer of bales.

According to another aspect of the present invention, there is provided a method of stacking rectangular bales, each resting in a field on a bottom thereof, said method comprising:

picking up the bales and placing them side by side on a bale transporter bed with the bottom of each bale resting on the bed; and tilting the bed of the bale transporter to form a vertical stack of bales with the bottoms of the bales aligned on a front side of the stack.

By placing the bales dense side down on the bed, when the bales are tipped on a stack, the less dense top is placed against the exposed side of a previous stack for support by that stack.

According to a further aspect of the present invention there is provided a bale transporter comprising:

a bale support bed;

a bale pickup having a pickup position for gripping a bale having a bottom resting on the ground;

lift means for moving the bale pickup between the pickup position and a raised position;

rotation means for rotating the bale pickup between the raised position and a delivery position above the bale support bed; and means for releasing the bale from the pickup in the delivery position to deposit the bale on the bale support bed with the bottom of the bale resting on the bed.

With this apparatus, the bales are lifted and rotated to place them on the transporter bed without inversion, and the dense bottom rests on the bed. As discussed above, this allows placement of the bales with the denser bottom out when stacked.

In the pickup, the lift means may include an arm pivoted on a horizontal axis transverse to the direction of travel and carrying the pickup adjacent its front end. An inclined pivot between the arm and the pickup swings the pickup to a horizontal position across the bed for unloading. This inclined pivot provides a strong and stable arrangement for the proper movement of the pickup, with a minimum of wear points.

The pickup itself may be a clamp type device approaching a bale from an end and gripping opposite lateral sides of the bale. These sides are the "stubble" sides of the bale. The bale strings or twine extends around the top, bottom and ends of the bale. There is thus little damage to the bale and none to the strings. This pickup technique has the transporter following the path of the baler over a field, rather than across the baler path. In many cases, and especially with irrigated fields, this is of importance. It allows the transporter to follow the terrain for rapid bale pickup.

At the back end of the bale bed are spring steel stops that support the bales as the bed is being tipped for unloading. These stops are relatively thin, for example ¾ inch (1.9 cm) in thickness. When tipping up, the flexing of the stops allows the bales to make early and good contact with the ground. Since they are thin, they will pull out without a tendency for the bales to follow. The finger flexibility has another benefit. Where a stack requires adjustment due to bales being in bad condition, the tipping frame can be tipped over center, to about 95°, and push over the top of a stack without the stops pressing into the ground.

According to a further aspect of the invention there is provided a bale transporter having a bale carrying bed, a pusher projecting above the bed and pusher operating means for advancing the pusher along the bed to push bales therealong, the improvement wherein the pusher operating means comprise:

a cable winding drum mounted on the transporter;

at least one cable wound on the drum and including two cable ends connected to the pusher;

cable reversing pulleys on the bed, with the cable engaging the pulleys between the cable winding drum and the pusher;

two hydraulic motors coupled to the drum for driving the drum; and hydraulic circuit means for selectively connecting the two hydraulic motors in series and in parallel.

This arrangement allows speed and torque changes to accommodate varying load and resistance conditions as will occur with changes in the humidity of the bales and the material and condition of the crop that is baled.

A bale transporter according to the invention may be capable of handling not only large 48 inch×48 inch×96 inch (122 cm×122 cm×244 cm) bales, but other bale sizes as well, for example 32 inch×34 inch×96 inch (81 cm×86 cm×244 cm) or 36 inch×48 inch×96 inch (91 cm×122 cm×244 cm), and others. The smaller bales may be arranged on the bed in a double layer and may be stacked up to 16 feet (4.8 m) high under suitable conditions.

BRIEF DESCRIPTION OF THE DRAWINGS

In the accompanying drawings, which illustrate an exemplary embodiment of the present invention.

DETAILED DESCRIPTION

Figure 1:
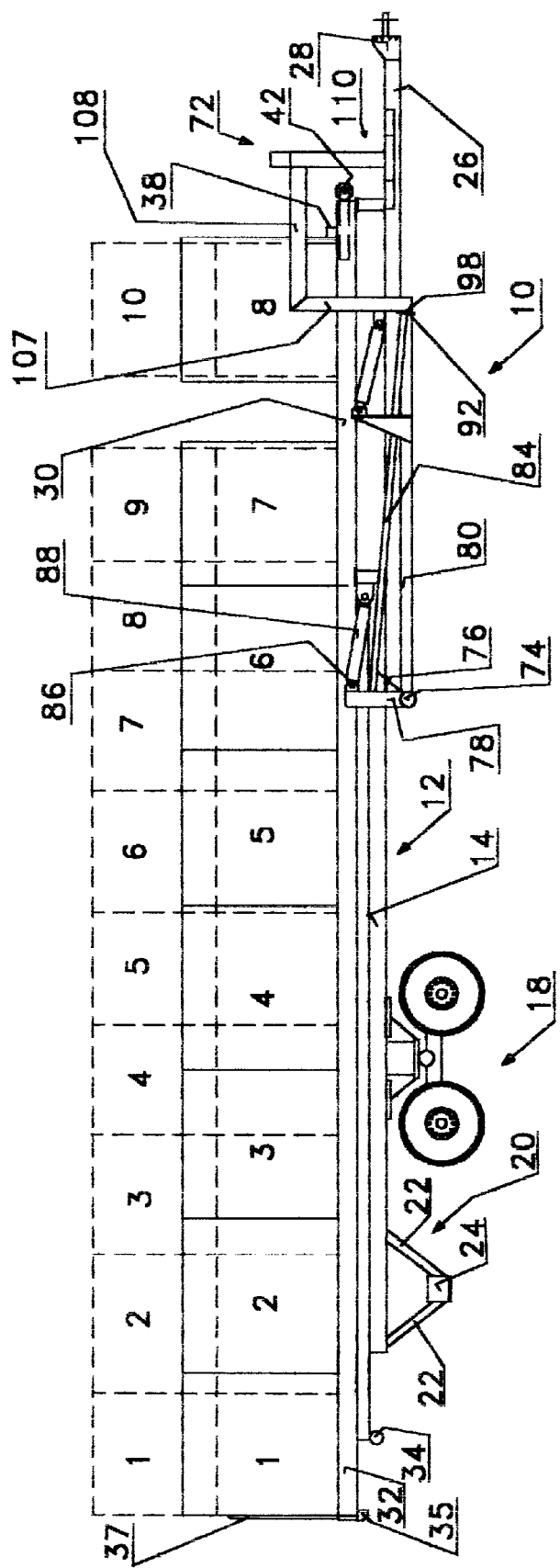
FIG. 1 is a side view of a bale transporter.
Figure 2:
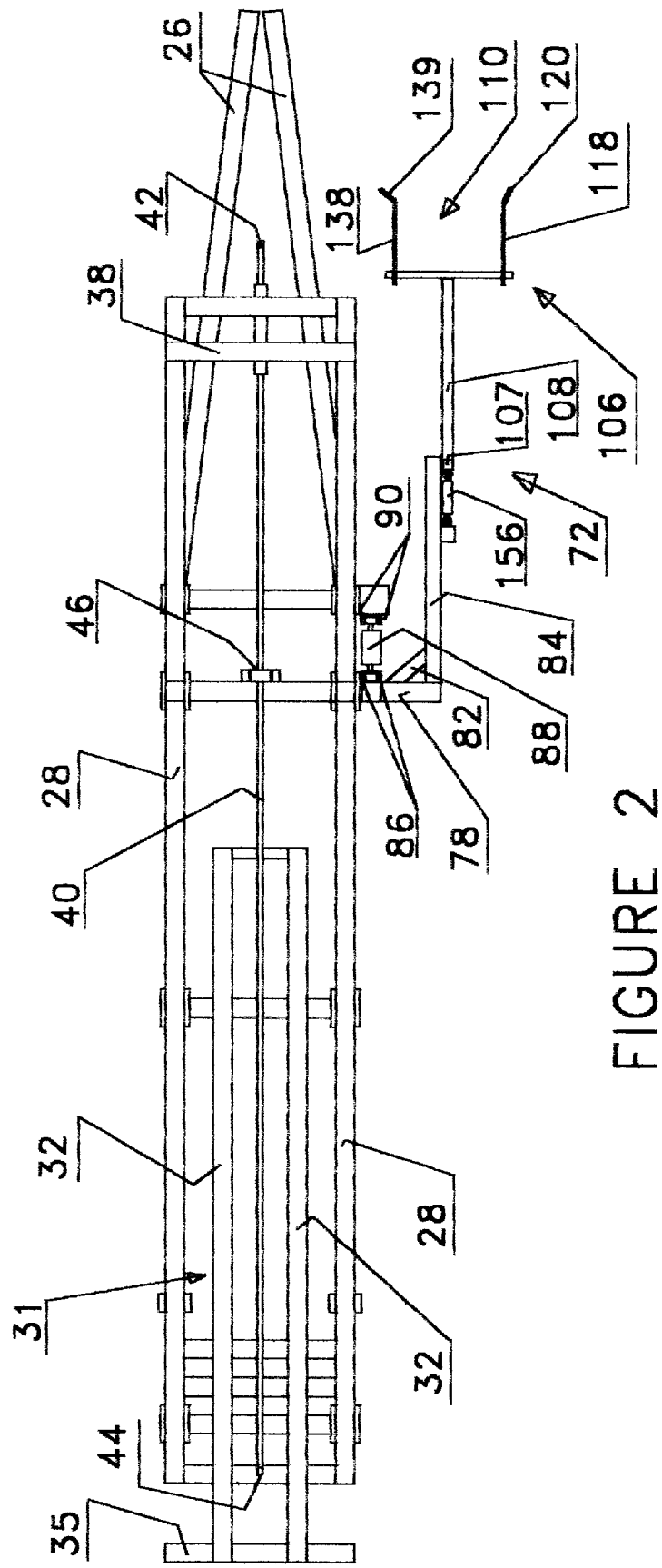
FIG. 2 is a plan view of the transporter.
Figure 3:
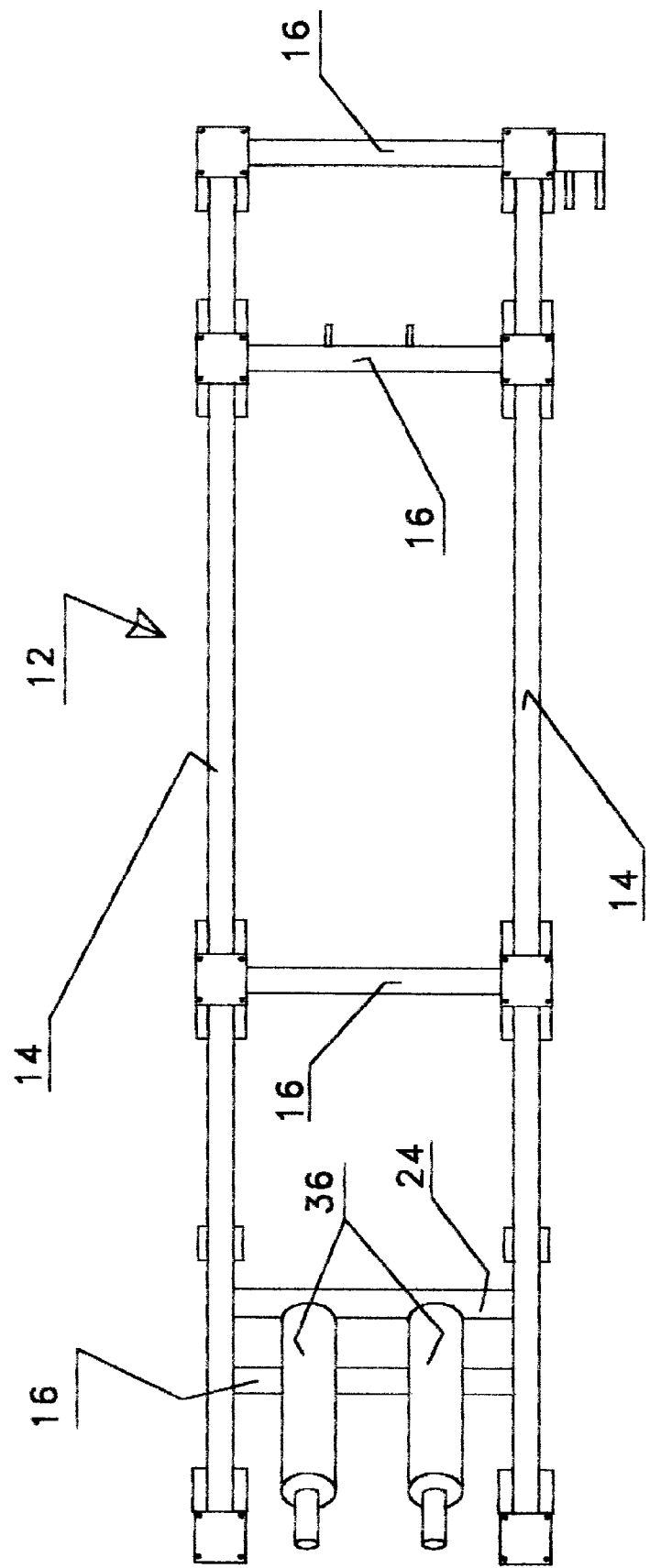
FIG. 3 is a plan view of the subframe.
Figure 4:
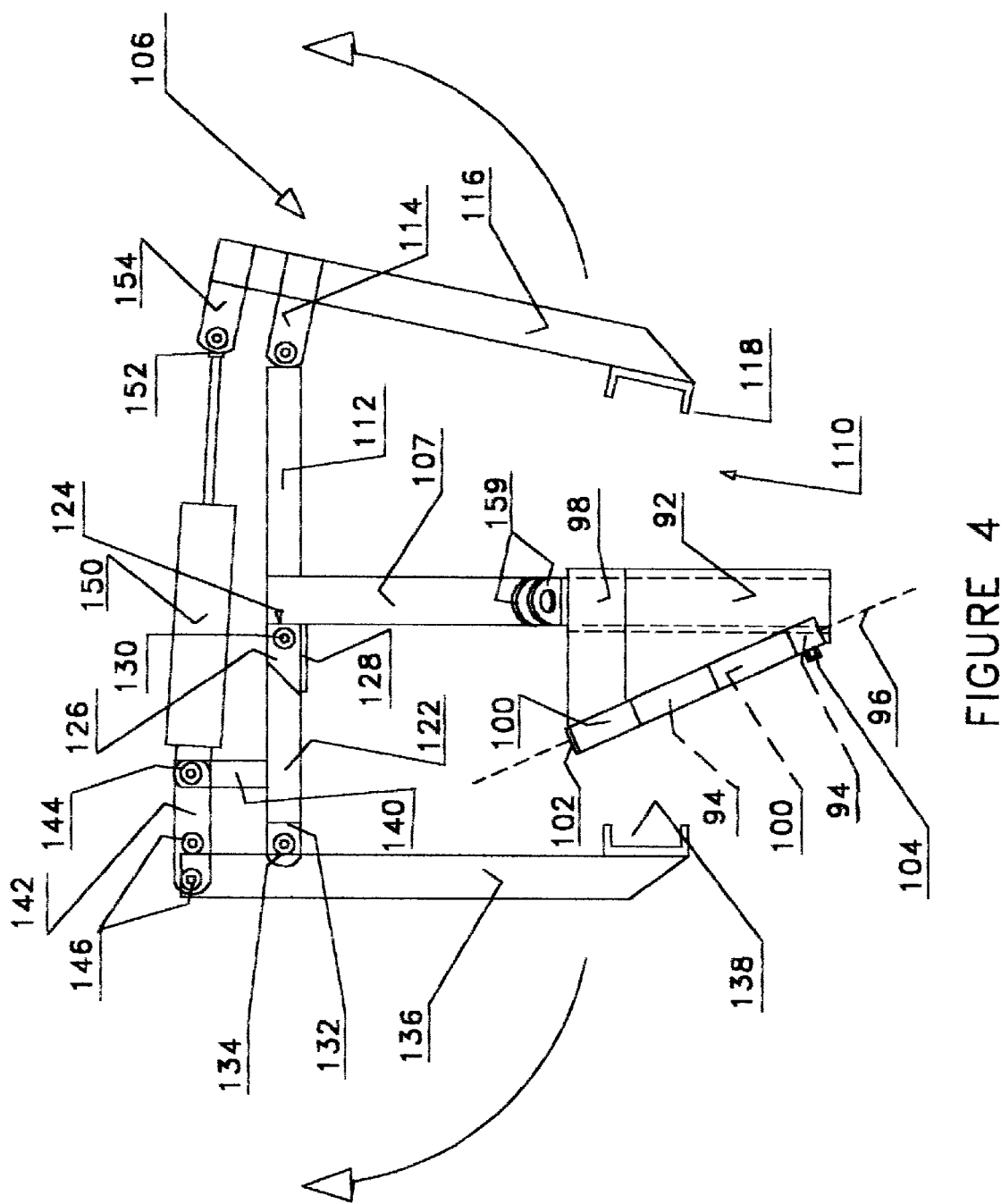
FIG. 4 is a back view of the pickup.
Figure 5:
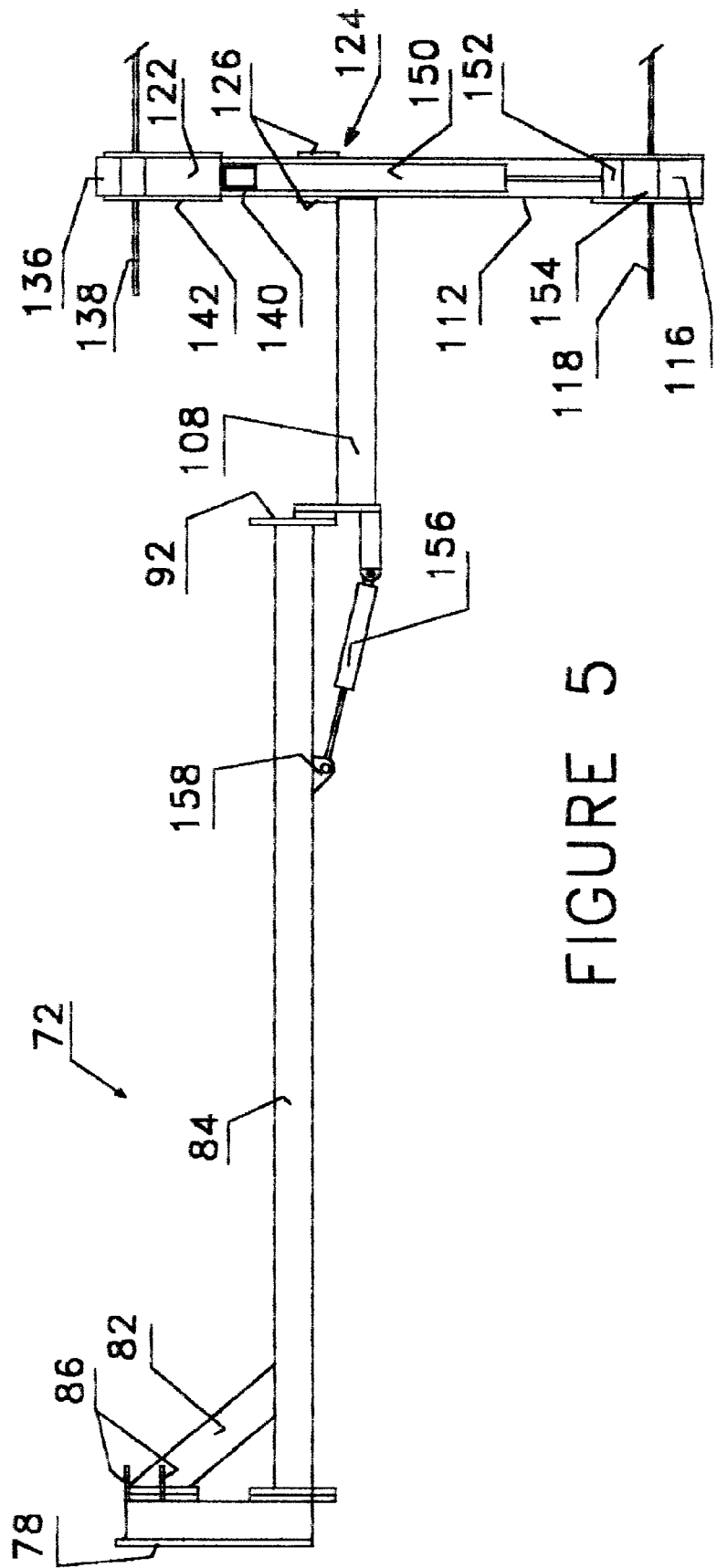
FIG. 5 is a plan view of the pickup and lift assembly.
Figure 6:
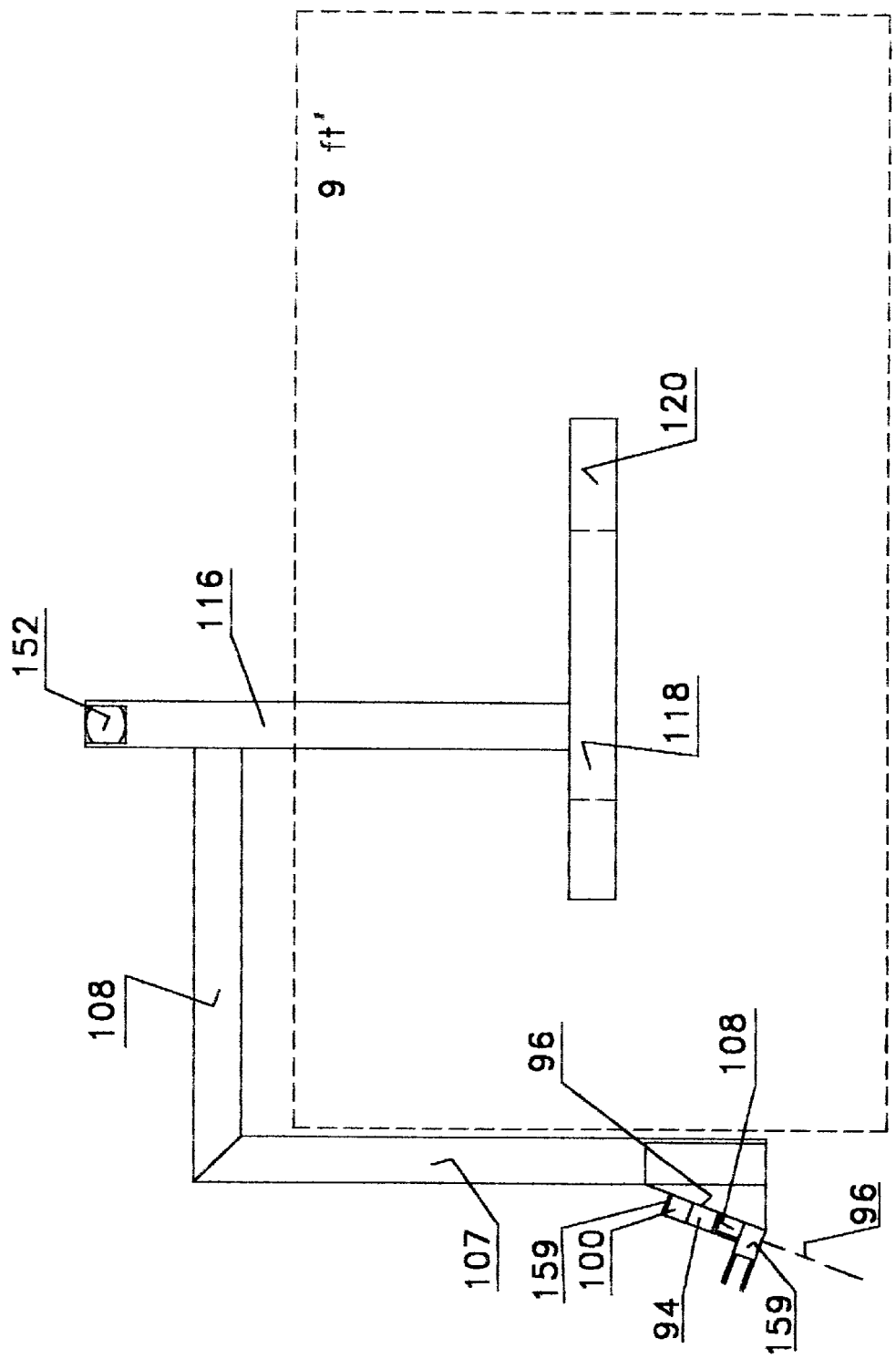
FIG. 6 is a side view of the pickup.

Referring to the accompanying drawings and particularly FIGS. 1, 2 and 3 there is illustrated a bale transporter and stacker 10. It includes a subframe 12 illustrated most particularly in FIG. 3. The subframe includes two side rails 14 joined by four cross members 16. The subframe is mounted on two wheel sets 18, one on each side of the transporter. At the back end of the subframe 12 is a frame 20 that serves as a lift cylinder mounting. This includes two downwardly convergent struts 22 below each side rail and a cross member 24 extending across the subframe and coupled to the struts where they meet.

At the front end of the subframe are two hitch beams 26. These converge forwardly to a hitch 28 to be coupled to a towing vehicle.

Mounted on the subframe 12 and the hitch beams 26 are two parallel bale support beams 30 extending from front to rear of the transporter. At the rear of the machine, between the bale support beams is a lift frame 31. This includes two parallel rails 32 that are mounted on the bale support beams by a transverse pivot 34 at the back end of the bale support means. The lift frame rails extend rearwardly beyond the bale support beams where they are joined by a transverse cross member 35. Two lift cylinders 36 (FIG. 3) extend from the cross member 24 of the lift cylinder mounting frame 20 to the respective lift frame rails 32 in front of the pivot 34. When the cylinders are actuated, they rotate the lift frame 31 to a vertical position at the end of the bale support beams 30. Projecting upwardly from the cross member 35 are two end stops 37. These are spring steel stops of relatively thin configuration.

Figure 7:
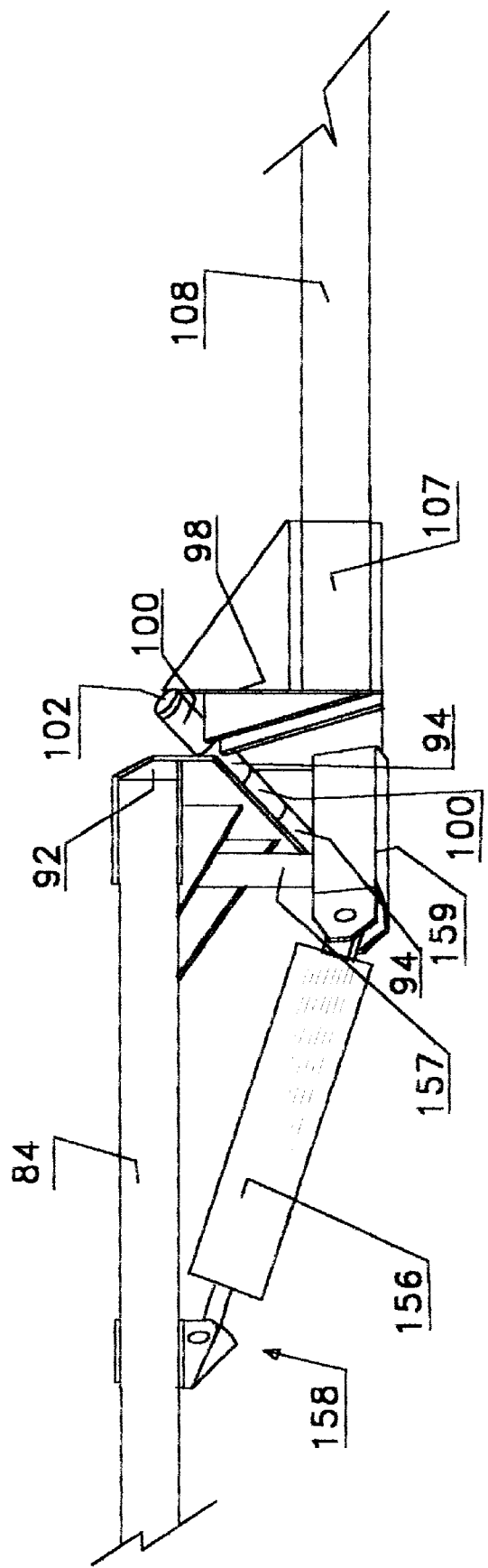
FIG. 7 is a plan view of a bale pickup pivot in the pickup position.
Figure 8:
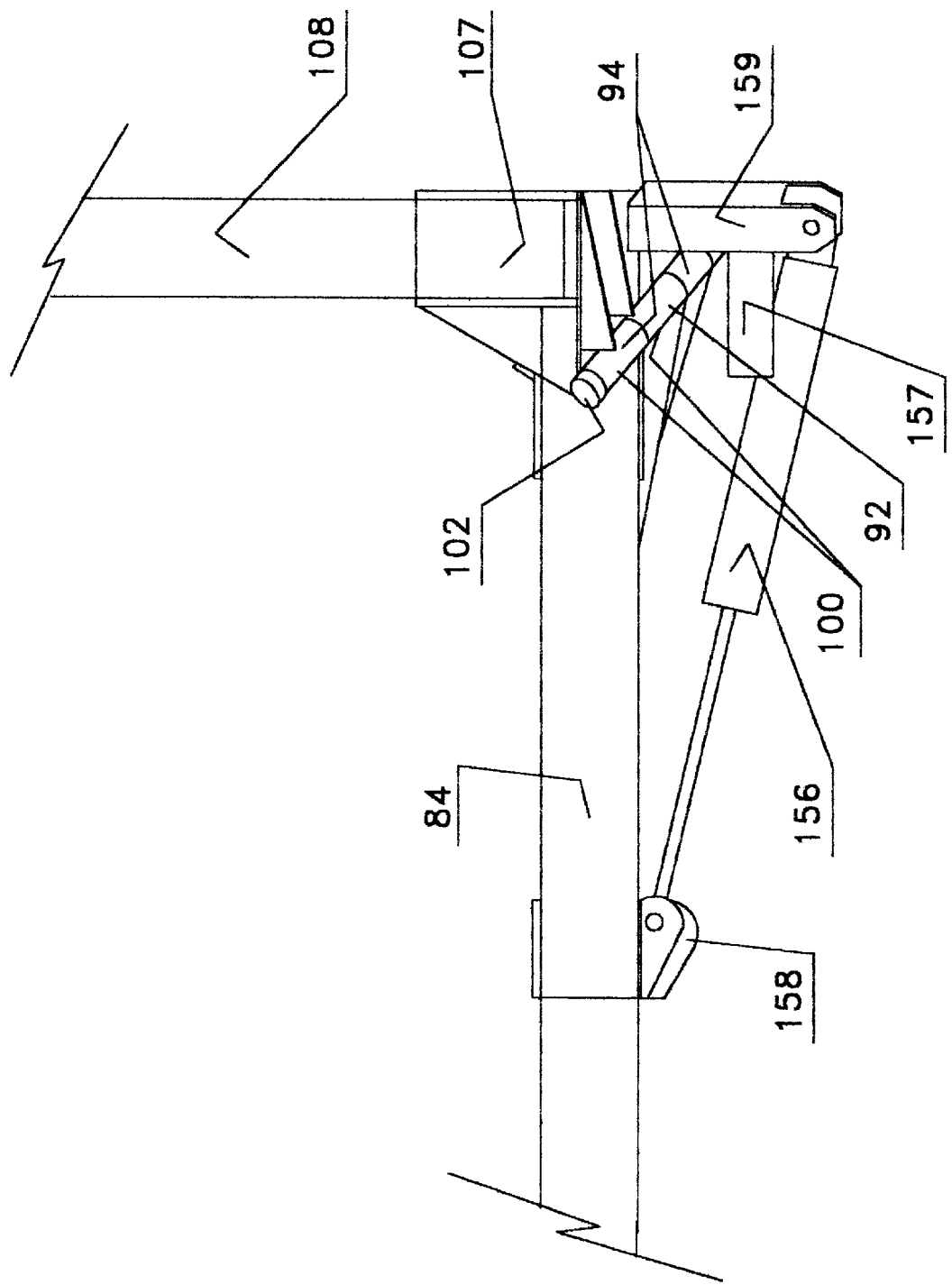
FIG. 8 is a view like FIG. 7 with the pickup in the delivery position.
Figure 9:
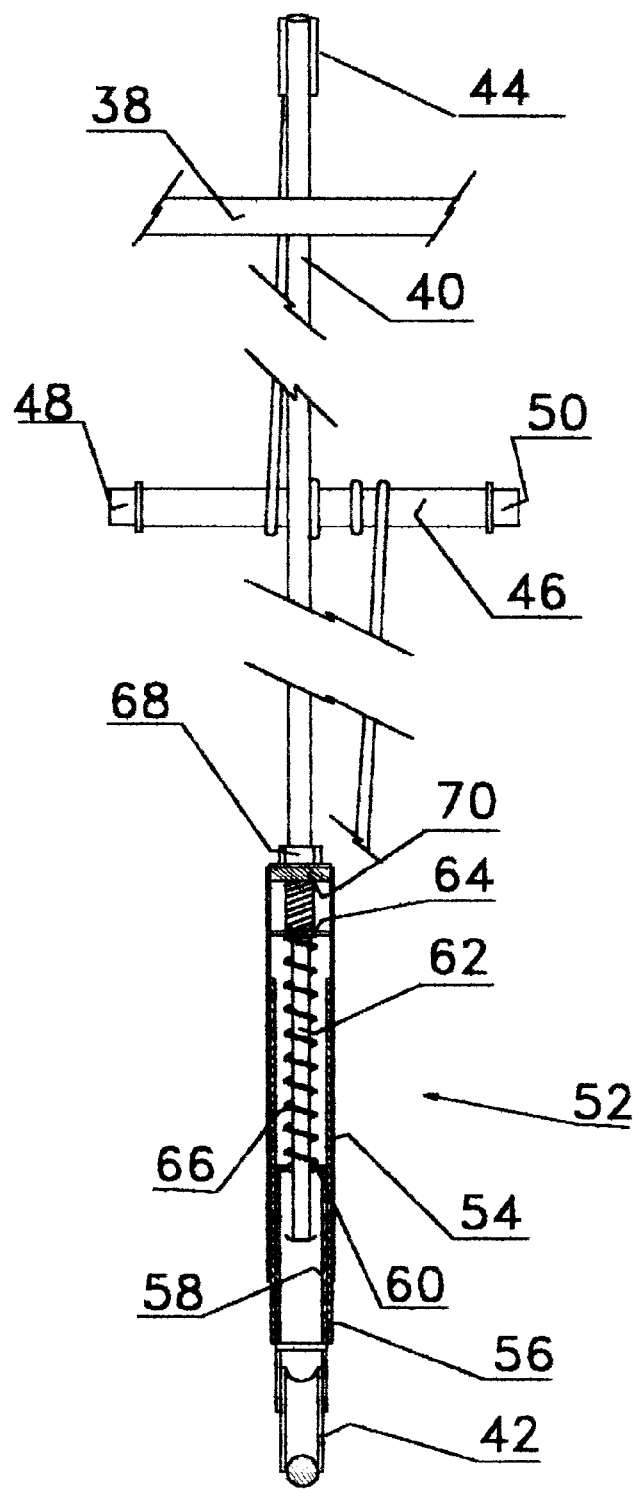
FIG. 9 is a plan view, partially in cross section of a bale pusher.

Supported on top of the bale support beams 30 is a transverse bale pusher 38. The pusher is connected to a cable 40. As illustrated in FIG. 7, the cable is wrapped around two pulleys 42 and 44 which are located adjacent opposite ends of the bale support beams. The return run of the cable is wound around a drum 46 mounted on the subframe 12. The drum is coupled at its opposite ends to respective hydraulic motors 48 and 50. An hydraulic circuit for the two motors will connect the motors either in parallel or in series in order to vary the torque applied to and the speed of rotation of the drum. This accommodates different bale conditions, for example, wet, heavy bales that will not slide particularly well along the bale support beams.

At the front of the transporter the pulley 42 is mounted on a cable tensioner 52. This includes an outer tube 54 mounted on the frame of the transporter. An inner tube 56 slides in the outer tube and carries a U-shaped spring retainer 58. The end flange 60 of the spring retainer is apertured to slide on a spring support pin 62. The back end of the pin has a head 64. A compression coil spring 66 extends between the end flange 60 and the pin head 64 to bias the inner tube out of the outer tube. The pulley 42 is mounted on the inner tube so that this will tension the cable wrapped around the pulley. At the back end of the tensioner is an adjustment bolt 68 threaded into a nut 70 fixed to the outer tube. The bolt acts on the pinhead 64 to adjust the compression of the spring and thus the tension on the cable.

Referring to FIGS. 1, 2, 4, 5 and 6, the apparatus includes a pickup assembly 72. This includes a pivot shaft 74 positioned below the subframe 12 and mounted on the subframe by a mount 76. The shaft extends laterally from one side of the subframe. The pivot shaft carries a rectangular lift arm frame 78. This has a vertical pickup position illustrated in FIGS. 1 and 2. In this pickup position, a lift arm 80 projects forwardly from the outer, bottom corner of the frame. A lateral brace 82 extends from the inner, lower corner of the frame 78 to the arm 80, while a brace 84 extends from the upper, outer corner of the frame 78 to the front of the lift arm 80. At the upper, inner corner of the frame 78 are two lugs 86 pinned to the rod end of an hydraulic cylinder 88. The base of the cylinder is pinned to lugs 90 on the subframe 12. Extension of the cylinder thus rotates the lift arm upwardly and vice versa.

At the front end of the lift arm is a hinge plate 92 that slopes upwardly to the front. The plate carries two spaced knuckles 94 providing a hinge axis that slopes both forwardly and inwardly. A second hinge plate 98 has two spaced knuckles 100 that are positioned above the knuckles 94 and linked to them by a pin 102. A locking bolt 104 through cross bores in the pin 102 and the lower knuckle 94 accommodates a locking bolt 104. The second hinge plate 98 carries a pickup 106. The pickup includes an upright 107 mounted on the hinge plate and a horizontal beam 108 projecting from the top of the upright. In the pickup position, the upright is generally vertical and the beam 108 projects forwardly, in the direction of travel of the transporter. The beam 108 carries a bale clamp 110.

Bale clamp 110 includes a fixed cross arm 112 projecting to an outer side of the beam 108. The outer end of the cross arm is pinned to a lug 114 on a clamp arm 116. At the bottom end of the clamp arm 116, on the inside, is an inwardly opening channel 118 that extends across the bottom of the clamp arm 118. The channel has an outwardly sloping lead end 120. The beam 108 also carries a pivoting cross arm 122 on that side opposite the fixed cross arm 112. A bracket 124 is mounted on the side of the beam 108. It includes two spaced flanges and a web 128 on the bottom to serve as a stop plate. A pivot 130 extending through the two flanges 126 pins the bracket to the pivoting cross arm 122.

On the end of the arm 122 are two lugs 132 pinned to a lug 134 on a clamp arm 136. At the bottom of the clamp arm 136, confronting channel 120, is a second channel 138. The leading end 139 of the channel 138 slopes inwardly towards the bale transporter to provide a tapered throat between the two channels 120 and 138 for receiving a bale.

A crank arm 140 projects upwardly from the pivoting cross arm 122. The crank arm is connected to an adjustment link 142 by a pivot 144. The link has two adjustment holes 146 that may be selectively pinned to the top end of the clamp arm 136 to adjust the angle between the cross arm 122 and the clamp arm 136. This accommodates bales of different sizes.

The base of an hydraulic cylinder 150 is pinned to the crank arm 140, while its rod end 152 is pinned to two lugs 154 on the clamp arm 118.

The pickup is rotated on the lift arm, about the hinge axis 96 by a cylinder 156 with its cylinder end pinned to a bracket 158 on the lift arm and its rod end pinned to a pair of lugs 159 on the upright 106.

Figure 10:
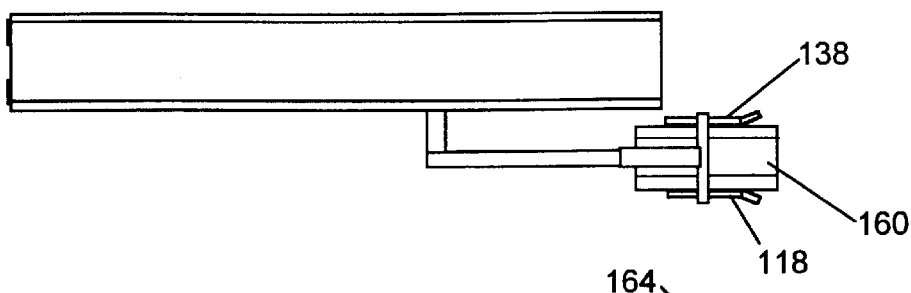
FIGS. 10 through 18 illustrate the sequence of operations in picking up bales and forming stacks with them.

In operation of the apparatus, as illustrated most particularly in FIGS. 10 through 19, the transporter is towed forwardly over a field. The bale pickup is in its lowered position (FIG. 1) and is opened to receive a bale 160 between the clamp arm channels 118 and 138 as shown in FIG. 10. With the bale in this orientation, the strings encircle the bale lengthwise around the top and bottom so that the channels do not engage the strings and cannot damage them.

Figure 11:
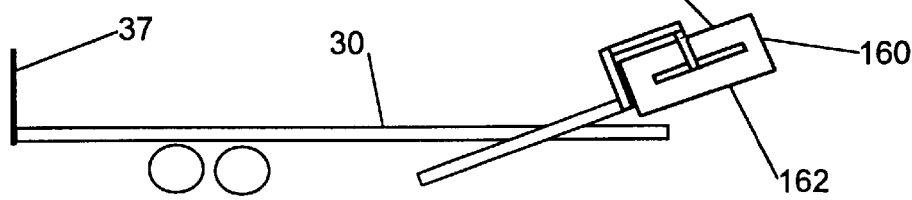
Figure 12:
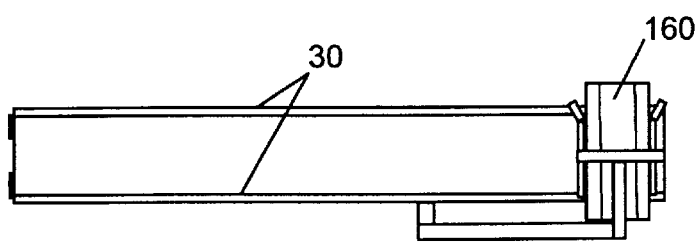

As shown in FIG. 11, the lift arm is then actuated to lift the bale to a raised position above the bed of the transporter provided by the bale support beams 30. This is a function of the lift cylinder 88. Pickup rotating cylinder 156 is then actuated to rotate the pickup to a delivery position above the transporter bed as illustrated in FIG. 12. The inclination of the hinge axis 96 forwards is equal the inclination to the inside, so that when the hinge plate 92 is vertical, rotating the pickup 90° to the delivery position orients the pickup and the bale horizontally across the bed of the transporter.

Figure 13:
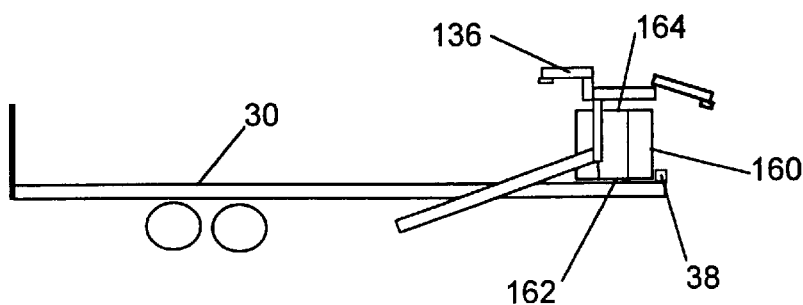

The pickup is then opened, rotating clamp arm 136 upwards to clear the top of the bale, as illustrated in FIG. 13. This is a function of bale pickup cylinder 150. The pickup is then swung back to its original pickup position using pickup rotating cylinder 156 and lift cylinder 188.

The bale 160, now supported by the bale support beams 30 is pushed to the rear of the transporter using the pusher bar 38, driven by the cable 40.

Figure 14:
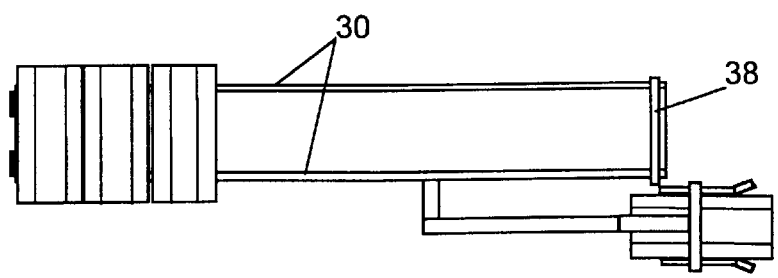

FIG. 14 illustrates the transporter after three bales have been picked up and deposited on the bed and driven to the back end of the transporter.

Figure 15:
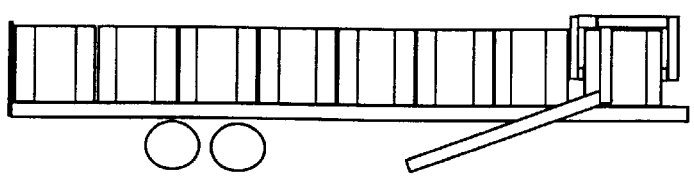

FIG. 15 illustrates a transporter carrying a full load of eight bales. With the apparatus in this condition, the transporter can be driven to an appropriate site for stacking of the bales.

Figure 16:
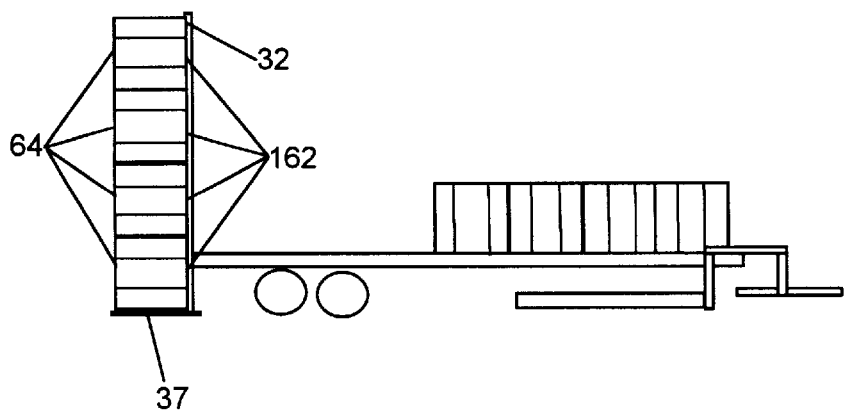
Figure 17:
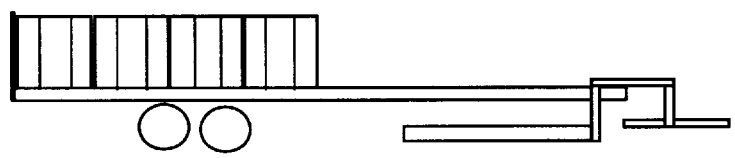
Figure 18:
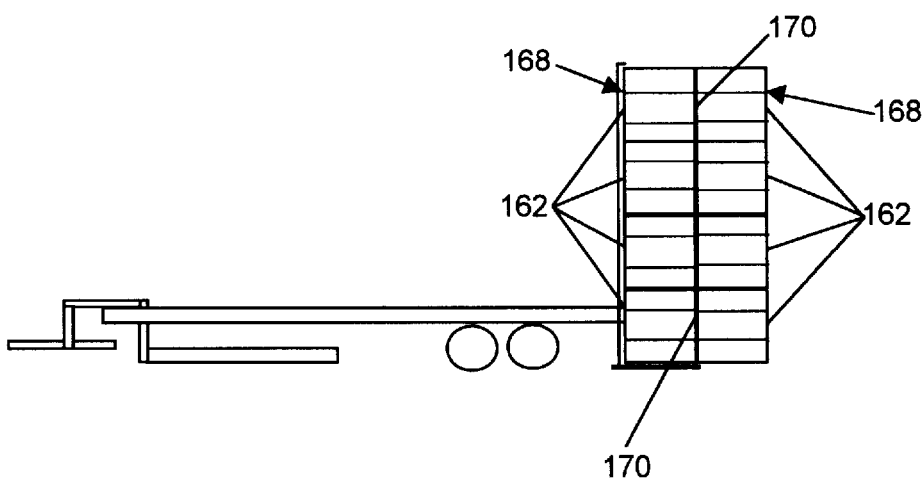

As shown in FIG. 16, the lift frame 32 is raised to a vertical position producing a vertical stack of four bales. The bales are resting on the spring steel end stops 37, which are in turn resting on the ground. When the transporter is pulled forward, the stops are drawn out from under the bales, leaving a stack of four bales on the ground. The bale pusher is then actuated to push the next four bales to the end of the transporter bed, as shown in FIG. 17. The transporter is then backed up to the opposite side of the existing four bale stack and the next set of four bales is put in place against the existing stack, as illustrated in FIG. 18.

As discussed in the foregoing, as bales are formed and as they rest in the field, there is a settling of the baled material to the bottom so that the bale becomes denser along the bottom 162 than along the top 164. The present system places the bale on the transporter with the denser bottom 162 supported on the transporter bed. When the bales are tipped up to the vertical position and the transporter is pulled away, leaving a stack 166, the exposed front side 168 of the stack is the original dense bottom 162 of each bale while the less dense top is at the back side 170 of the stack. Thus, when stacks are arranged as shown in FIG. 16, with the less dense sides against the next adjacent stack, the stacks will tend to sag against one another and be mutually supporting.

Figure 19:
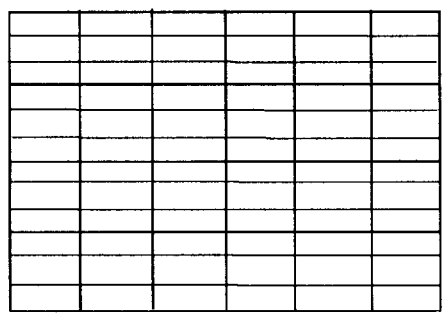
FIG. 19 illustrates a stack of bales formed according to the present invention.

FIG. 19 illustrates a four high by six deep stack of bales. On both sides, the bales are arranged with the original bottom 162 of each bale facing the outside. At one interface in the stack, the stacks will be arranged with the less dense top sides facing towards one another. A bale stack arranged in this way will be self supporting without tending to collapse. If the bales are arranged in the opposite way, with the denser, bottom sides on the inside, the complete stack will tend to collapse to the outside.

The apparatus may be equipped with a control system allowing either manual or automatic operation. In the manual mode, the individual functions of the pickup and transporter are actuated independently, using individual controls.

In the automatic mode, the operator initiates the loading sequence with a single control when a bale is in the loading position. This causes the pickup to clamp or "squeeze" the bale and then automatically raises the lift arm to a preset height, rotates the pickup 90°, releases the bale, rotates the pickup forwards, lowers the lift arm to the pickup position and stops, ready for the next bale. The pusher is then actuated to move the bale back, clear of the delivery position.

In a two row mode, where smaller bales are stacked two deep on the transporter bed, the pusher delivers each bottom row bale to a preset position to ensure that the following bale for the top row is placed directly on the bottom bale. In both one row and two row modes, the pusher returns automatically to the forward, "park" position.

While one particular embodiment of the present invention has been described in the foregoing, it is to be understood that other embodiments are possible within the scope of the invention and are intended to be included herein. For example, the apparatus and method have been described in connection with the pick up, transportation and stacking of large, square bales. It can also be used for other bale formats, including small square bales which can be stacked in two rows on the transporter bed. The embodiment described above carries eight bales, and stacks the bales four deep. Other arrangements can be used, for example a four bale carrier using a bed that tilts instead of a separate tipping frame. The invention is therefore to be considered limited solely by the scope of the appended claims.

I claim:

1. A bale transporter comprising:

ground support wheels supporting the transporter for travel in a forwards direction;

a bale support bed;

a bale pickup having a pickup position for gripping a bale having a bottom resting on the ground;

a lift arm pivotally mounted on the transporter for rotation about a substantially horizontal lift arm axis transverse to the forwards direction, the bale pickup being mounted on the lift arm at a position spaced in the forwards direction from the lift arm axis;

a lift arm rotator for rotating the lift arm about the lift arm axis for moving the bale pickup between the pickup position and a raised position above the pickup position;

a pickup rotator for rotating the bale pickup between the raised position and a delivery position above the bale support bed; and a pickup release for releasing the bale from the bale pickup in the delivery position to deposit the bale on the bale support bed with the bottom of the bale resting on the bed.

2. A transporter according to claim 1 wherein the bale pickup comprises a bale clamp with two bale engaging grippers spaced apart transversely of the forwards direction to receive a bale therebetween, and a clamp actuator for moving the grippers towards one another to grip a bale.

3. A transporter according to claim 1 wherein the pickup rotator comprises a hinge coupling the lift arm and the bale pickup.

4. A bale transporter according to claim 3 wherein the hinge comprises a pivot axis that is upwardly inclined forwardly and inwardly towards the bale support means in the pickup position of the bale pickup.

5. A transporter according to claim 4 wherein the inclination of the pivot axis is such that the bale pickup is substantially horizontally oriented in the pickup and delivery positions.

6. A transporter according to claim 1 including a pusher for moving bales along the bale support bed.

7. A transporter according to claim 6 including end stops for limiting the travel of a bale along the bed.

8. A transporter according to claim 7 wherein the end stops comprise spring steel stops projecting from the bed at a back end thereof.

9. A bale transporter comprising:

a bale support bed;

a bale pickup having a pickup position for gripping a bale having a bottom resting on the ground;

a pickup lift for moving the bale pickup between the pickup position and a raised position;

a pickup rotator for rotating the bale pickup between the raised position and a delivery position above the bale support bed;

a pickup release for releasing the bale from the bale pickup in the delivery position to deposit the bale on the bale support bed with the bottom of the bale resting on the bed;

a pusher for moving bales along the bale support bed;

end stops for limiting the travel of a bale along the bed; and tilt means for rotating a plurality of the bales carried by the bale support bed about a transverse pivot to a vertically stacked condition.

10. A transporter according to claim 9 wherein the end stops comprise spring steel stops projecting from the bed at a back end thereof.

11. A bale transporter comprising:

a bale support bed;

a bale pickup having a pickup position for gripping a bale having a bottom resting on the ground;

a pickup lift for moving the bale pickup between the pickup position and a raised position;

a pickup rotator for rotating the bale pickup between the raised position and a delivery position above the bale support bed;

means for releasing the bale from the bale pickup in the delivery position to deposit the bale on the bale support bed with the bottom of the bale resting an the bed;

a pusher for moving bales along the bale support bed, pusher operating means for advancing the pusher along the bed to push bales therealong, wherein the pusher operating means comprise:

a cable winding drum mounted on the transporter;

at least one cable wound on the drum and including two cable ends connected to the pusher;

cable reversing pulleys on the bed, with the cable engaging the pulleys between the cable winding drum and the pusher;

two hydraulic motors coupled to the drum for driving the drum; and hydraulic circuit means for selectively connecting the two hydraulic motors in series and in parallel.

12. The invention according to claim 11 wherein the pulleys are adjacent opposite ends of the support bed.

* * * * *